United States Patent Office 3,424,309
Patented Jan. 28, 1969

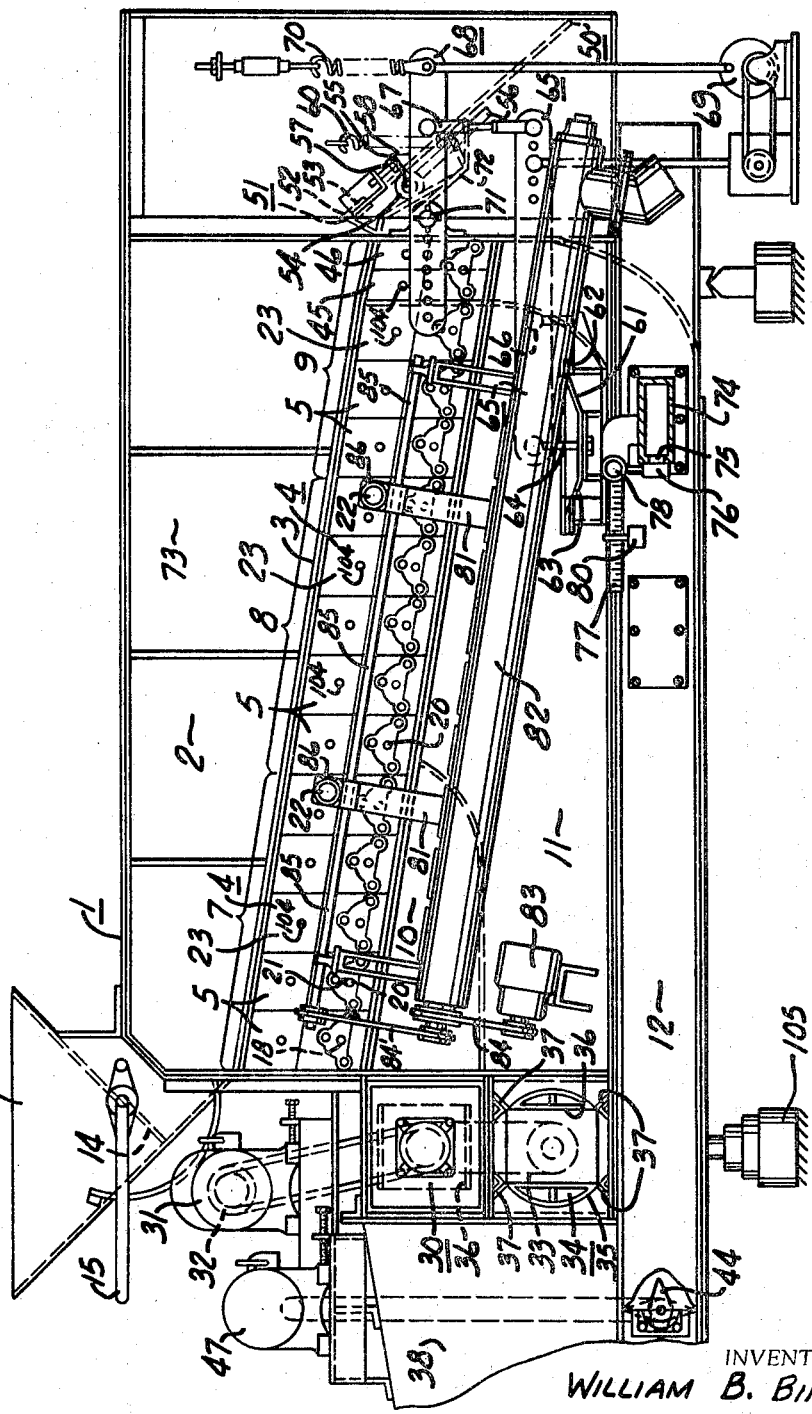

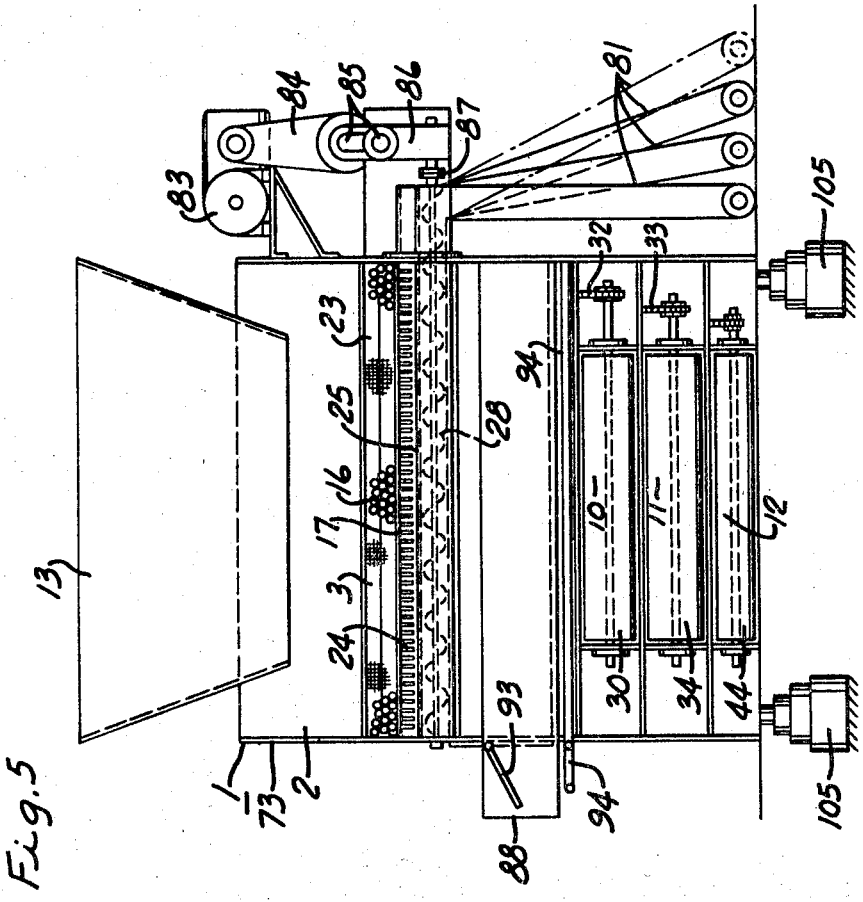
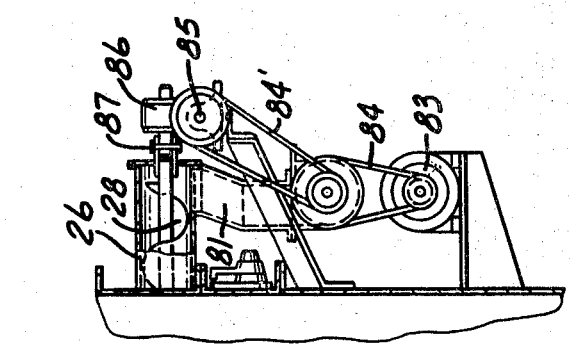

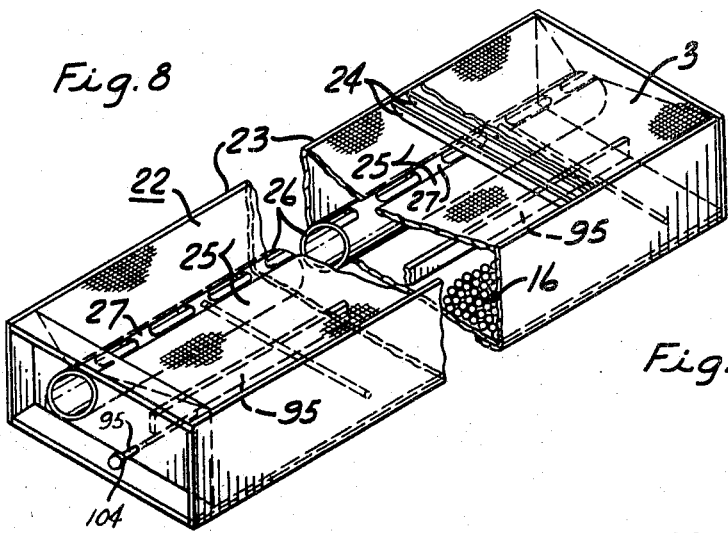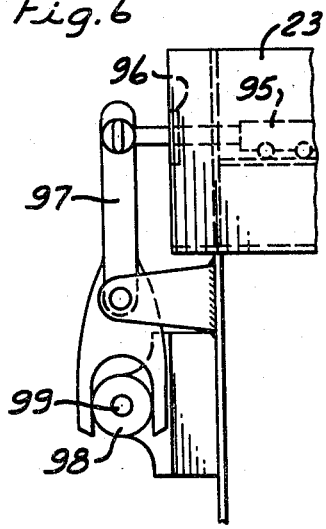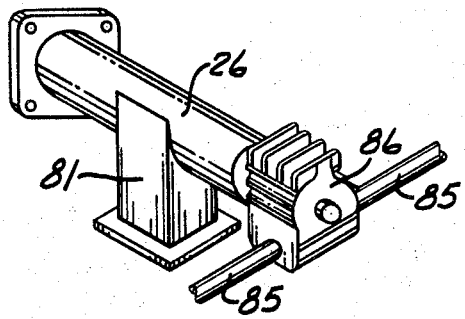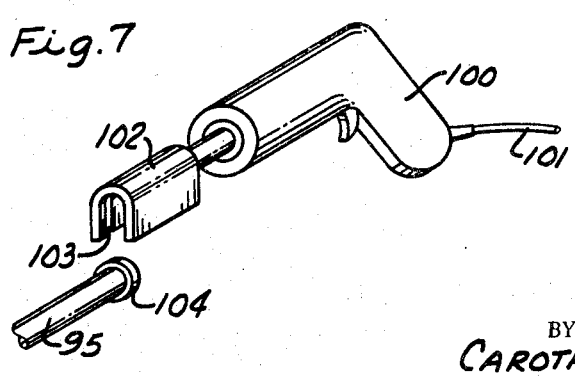

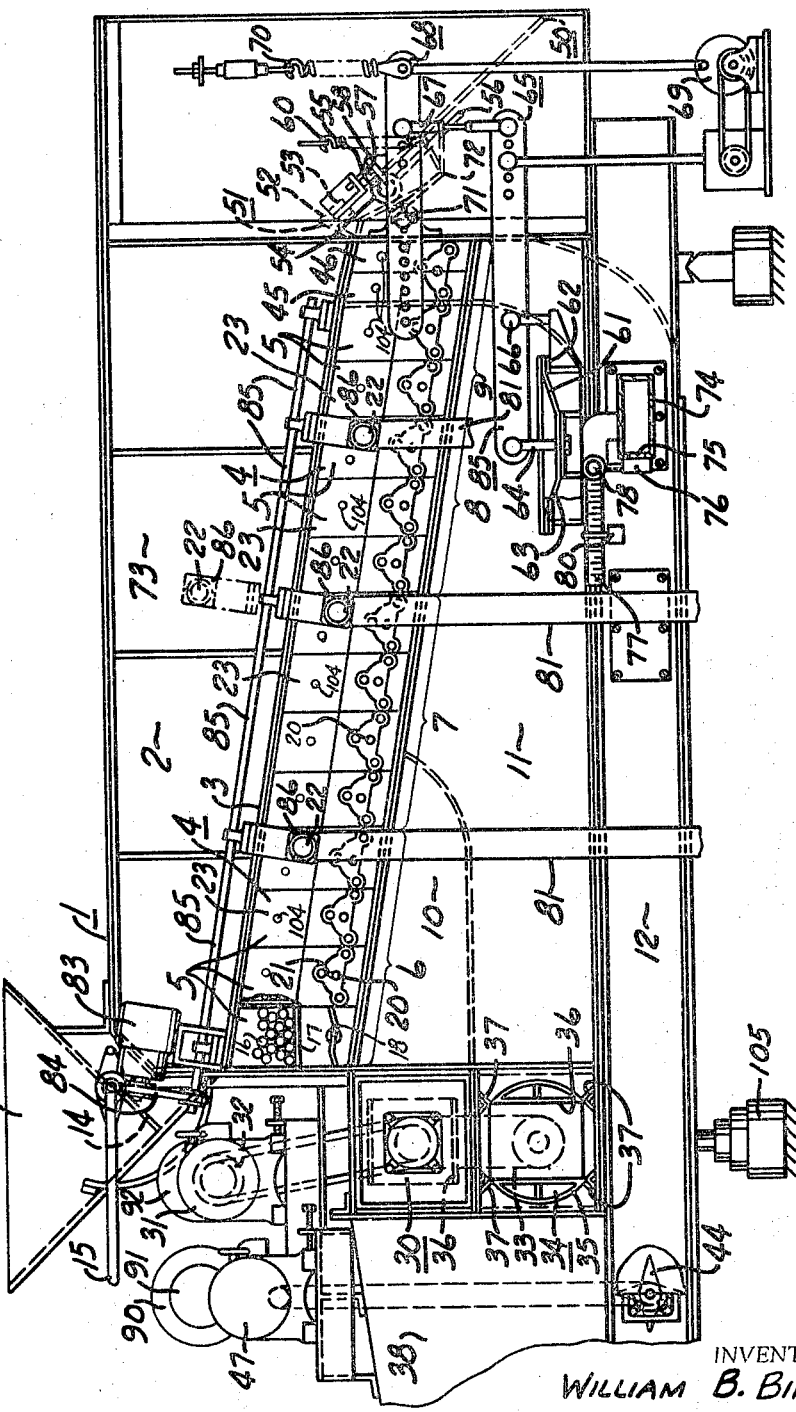

3,424,309
PNEUMATIC SEPARATOR AND CLASSIFIER
APPARATUS AND METHOD
William B. Binnix, % Ridge Equipment Company,
Fallentimber, Pa. 16639
Filed Dec. 7, 1965, Ser. No. 512,089
U.S. Cl. 209—44                    16 Claims
Int. Cl. B07b 3/12

ABSTRACT OF THE DISCLOSURE

A method and apparatus for pneumatically classifying a bed of uniformly crushed materials suspended on a downwardly sloping screen made up of a series of interchangeable marble pack cells each having its own screen section and selected of the same having different sized screens and a lateral draw off means with means to vibrate their screen section, which together with one or more preceding marble pack cells forms a cell unit. The screen is supplied with upwardly pulsating air under pressure through the full length of the bed which is stratified and separated at the lower end. Selectively separating and withdrawing materials of different sizes from selected said cell units at predetermined interchangeable intermediate positions and relocating the positions of the selected cell units to obtain a predetermined classification and controlling the rate of flow of the bed of material by controlling the supply of pulsating air along the full length of the bed and by controlling the rate of flow from the end of the bed in cooperation with the controlled air supply to selectively classify and laterally draw off the classified materials.

---

This invention relates generally to the method and apparatus for selectively classifying by removal of minerals of predetermined size, quantity and specific gravity from predetermined sections of a downwardly sloping and traveling mineral bed suspended by pneumatic pulses.

Mineral beds such as coal and ore of different character, have been separated by pneumatic suspension administered under a downwardly sloping screen. In a coal separator where the waste such as heavy rock, bone core, sulphur balls and slate, are being separated from the coal, the principal part of the waste separation is at the lower end of the bed where a gate is provided. Again smaller particles of this waste may be taken at the interim or intermediate travel of the bed to avoid too great a density at the lower end of the bed. This waste is of the same specific gravity and is readily forced back up on top of the traveling mineral bed into the coal strata even though they have the same specific gravity. This is disclosed in U.S. Letters Patent 3,065,853. Such separation is referred to in the art as "pneumatic fluidizing" and is helpful in separating materials of different specific gravity but it is not classification. It is merely separation and cannot be employed as classification. This is particularly true where the mineral treated is crushed to a uniform size which is usually not the case where coal is being separated.

Thus, the problem is to provide a classifier and not merely a separator. In order to do this it was discovered that the pre-selector draw off cell units had to be capable of being positioned at predetermining locations along the downwardly traveling bed. This pre-selection of position changes for different character of the same mineral. If the mineral comes from a different stratification it requires a different arrangement of the pre-selecting classifiers and the machine must be made flexible enough to accomplish this purpose. Even consecutive loads may require prepositioning of these classifying pre-selectors which requires a quick change from one location of the separator to another.

The principal object of this invention is the provision of a downwardly sloping mineral bed suspended by interchangeable pneumatic classifying pressure cell units causing the bed to flow downwardly for stratification and classification of the mineral. Without these interchangeable and pre-selected classifying cell units which draw off the properly classified materials, the pneumatic separator cannot be employed as a classifier. Thus, two or more preclassifying pneumatic pressuring cells to draw off the classified material in combination with predetermined pneumatic pressure cells ahead of the classifying cell units provide proper classification of different minerals from the first part of the bed as well as intermediate positions of the bed.

Since the classification of minerals may change owing to the change in content of the different materials coming from the same mine or even from the same strata, it is necessary to make the machine flexible enough to interchange the marble cells and the pneumatic pressure passing therethrough as well as the location of the classifying cells that withdraw the minerals at different positions along the bed of the machine. Thus, any of the first twelve cells of the machine are made replaceable or interchangeable. The bed is generally divided into three different pulsating stages and two of these stages are of different pressures. With the differently positioned classifying cells that withdraw the minerals at different positions along the bed, additional pneumatic pressures are required. Thus, each cell, whether it is a suspension cell or a classifying cell must be capable of selectively receiving the proper pneumatic pressure through valving. This flexible and interchangeable feature of the cells in this machine is an important object of this classifying machine.

In order to properly employ the machine comprising this invention, it is important to note that to properly classify one of the selected materials as to size, weight, etc., it may be necessary to supply the entire downwardly sloping mineral bed with a complete line of pneumatic classifying pressure drawoff cell units. On the other hand, it may be advisable to supply the entire bed with marble pack cells such as disclosed in U.S. Letters Patent 3,065,-853 with only separation of materials being made at the lower end of the machine. However, generally, in order to obtain the desired classification, it is usually necessary to provide some combination of marble pack cells and marble pack classifying drawoff units.

When an application calls for a plurality or substantially all of the cells in the classifier to be classifying drawoff units, the need for a gate at the lower end of the machine to control the downward flow of the material on the machine in order to provide and insure good pneumatic fluidizing as well as provide an area for separation of reject from the materials to be separated therefrom is eliminated as well as the control elements associated therewith disclosed in above mentioned U.S. Letters Patent. However, for the generally desired classification where a combination of regular marble pack cells and marble pack classifying drawoff units are employed, a constant time operated gate of minimum opening may be provided at the lower end of the downwardly sloping bed.

Another object is the provision of an independently and individually replaceable marble cell and an independently and individually replaceable marble cell unit combined with a lateral classifier that are insertable in any of the cell positions prior to the last two high pressure cells at the end of the classifying bed before the drawoff gate.

Another object is the provision of a novel manually operable pneumatic vibratory gun for reciprocating the marble rakes.

Another object is the provision of a novel cam drive to operate all the marble rakes simultaneously.

Other objects and advantages appear hereinafter in the following description and claims.

The accompanying drawings show for the purpose of exemplification without limiting the invention claims thereto, certain practical embodiments illustrating the principles of this invention wherein:

FIG. 1 is a view in side elevation partly in section illustrating the classifier having individual and independently replaceable cells.

FIG. 2 is a rear view of the classification removal system.

FIG. 3 is a perspective view of the classification takeoff.

FIG. 4 is a longitudinal view partly in vertical section of a modified classifying structure with individual and independently replaceable cells.

FIG. 5 is a transverse view in vertical section of the structure shown in FIG. 4.

FIG. 6 is a view in vertical section of the cam operated marble rake.

FIG. 7 is a perspective view of a manually operated marble rake reciprocator.

FIG. 8 is a perspective view of an interchangeable cell box fitted with a screen and auger drawoff.

Referring to the FIGS. 1, 4 and 5 of the drawings, the mineral classifier comprising this invention is an extension of the structure of the pneumatic stratifier. This classifier does stratify the mineral bed and does pneumatically float the bed so that the bed as a whole floats down over the screen to the principal separator gate at the lower end of the bed. However, in the invention each of the marble cells are removable and may be replaced by marble cells having different flow characteristics which are necessary to pulsate that portion of the bed to effect a classification where the selected mined material or mineral will be removable.

Thus, not only do the marble cells differ from one another but so do the classifying cells which drawoff the classified material and thus differentiate this structure from a pure separator. Adjacent cells, although they each pass a pulsating pneumatic pressure, will vary in pressure and in pulsating frequency together with volume to perform a specific rapid classification and separation of the minerals along the bed before the gate.

The framed enclosure 1 has five different chambers, the material chamber 2 above the bed which lies on the downwardly sloping screen, 3. The second chamber 4 contains the marble cells 5 directly under the bed screen 3 which is divided into four different sections, 6, 7, 8 and 9, sections 7 and 9 actually being separated into two pressure divisions. It will be noted that each of these sections are terminated by a classifying lateral draw off except the last section 9 which ends in the gate at the lower end of the bed. Thus, a draw off classifier limits the section and the length and number of sections chosen and this may vary depending upon the minerals to be classified and instead of four sections 6, 7, 8 and 9 as in FIG. 4 there are only three in FIG. 1.

The third and fourth chambers 10 and 11 are pneumatic supply chambers that supply substantially the first and second halves of the bed except where the independent pressure is required which is indicated in FIG. 5. The last chamber 12 supplies the last two cells under the bed which provides the most dense material on the under side of the moving bed at the gate. Thus, chambers 10, 11 and 12 represent divisions in air pressure and the sections 6 to 9 may readily change or be partially eliminated in setting up this classifier. To set up the classifier an analysis of the mineral to be classified is taken to determine the size and specific gravity of the different minerals or grades of one mineral are to be considered. This information may be fed to a computer to determine the characteristics of the several cells in each section and thus determining which mineral as well as size is to be removed in the respective section. When the cells are set in accordance with this information, the density pressure pulsations and operation of the classification drawoff screw may be selectively determined.

The chamber 2 is supplied with the mineral to be classified which is preferably caused to a predetermined size that will react to the selected pneumatic pulsating pressures to effect the proper classifications. A hopper 13 is positioned at the upper end of the bed to continuously supply the mineral bed function as a continuous operating machine. The flow of this material in the hopper is determined by the valve operated by the handle 15. The mineral proceeds down across the screen to the lower end of the bed. The sections 6 to 9 under the screen have a different number and weight marble cells 5 and different pneumatic pressures depending upon the location of each lateral withdrawal of classified material.

As the mineral proceeds down over the screen in its floating state by pulsating air pressure, the cells 5 are interchangeable and each cell contains the pack of marbles 16, preferably glass, to diffuse the upwardly traveling air which passes through the screen 3 to suspend the mineral bed and the specific gravity of the minerals determines the relative stratification accordingly. The marbles are in turn supported on the mesh 17. The weight and size of the marbles have a definite effect on the air pressure. However, the valves 18 also regulate the air pressure traveling to and through the marbles in each cell which diffuses the pulsating air. These valves 18 are of the vane or butterfly type, each secured to their shaft 20, operated by the indicating handle 21 and which together with the depth of the marble pack and the initial air pressure supplied thereto determines the amount of air admitted to that section of the screen 3. Thus, the particular marble pack 16, the air valve 18, the pneumatic air pressure supplied to each cell 5 is one of the determining factors for the proper point or position of a classifying drawoff unit along the sloping screen 3.

In classifying, as in separating by stratifying, the particles of heavier specific gravity are interspaced in throughout the introduced mineral bed. The particles of heavier specific gravity tend to sift to the lower strata of the bed. In the initial part or first quarter of the bed the smaller sized paricles of heavier specific gravity have a tendency to get to the lower strata on screen 3 because of their size and the fact that there is no heavy concentration in the lower strata of the bed of high specific gravity particles making up an impenetrable strata. Thus, small and medium sized particles of low and high specific gravity may be removed in the first three cells. Size as well as the specific gravity of the particles drawn off laterally increase toward the lower end of the bed where the cells provide a special pneumatic characteristic for suspending a highly concentrated strata of the bed and the greatest separation is effected by a gate.

However, these intermediate take off units 22, as illustrated in FIG. 8, are three in number and each provide a special marble pack 23 at the forward end of the cell and a special comb type screen 24 which is flush with the perforated screen 3. This screen section may likewise be perforated. In each instance, the screen section 3 or 24 may or may not be a part of the classifier unit 22, and when the classifier 22 is in place it forms the screen 3 along with the other pulsating sections regardless of their size opening.

It should be pointed out that references to FIG. 1 or 4 in regard to the position and number of regular marble pack cells 5 and takeoff units 22 is merely for purposes of illustration since the number of takeoff units desired and their relative position along the sloping screen 3 is dependent on the size and specific gravity material to be classified.

The classified drawoff passes through the screen 24 and onto the finer screen 25 where it is directed to the down slope of this screen of this cell and into the spaced openings in the transverse pipe 26 which spaced openings along its top side 27 permit the selected mineral to enter the screw 28 to be conveyed laterally of the machine. The three classifiers 22 are each removable or replaceable or shiftable with each of the cells 5. As shown, three cells 5 precede the first and second cassifiers 22 whereas the third classifier 22 has only two preceding cells 5. It is preferable to change the pressure in the preceding cells 5 as well as the classifier cell unit 22 so that the preselected size is determined by the screen 24. Thus, the screen opening or gauge of the screens 24 and 3 is another important factor in drawing off the desired size of material pneumatically fluidized on the sloping screen 3.

The first two sections of the cells and the first two classifier units are supplied by the pneumatic chambers 10 and 11, the pneumatic pulsations of which are produced by the rotary valve 30 driven by the variable speed motor 31 and its reducer and chain drive 32. A second chain drive 33 operates the rotary valve 34 in pneumatic chamber 11. These valves have a spherical plug valve 35 with a central passage 36. The adjustable port members 37 cooperate with the spherical plugs 35 to provide a smooth cutoff of the supply of air to pulsate the same. The valves 30 and 34 are out of phase so that the air supplied to their respective chambers 10 and 11, alternately pulsate. This being variable becomes a factor in the pneumatic suspension of different minerals and different mineral bed thicknesses. Thus, the air in chamber 10 is pulsed while the air in chamber 11 is not pulsed, and they are thus one hundred and eighty degrees out of place. Such pulsation and particularly alternate pulsation of the pneumatic pressure aids in pneumatic suspension as well as mineral separation in accordance with specific gravity as well as size.

The duct 38 supplies air for both valves 30 and 34 from a fan driven by a variable speed motor and the chamber 12 in turn is supplied with air from another fan driven by another variable speed motor as disclosed in Patent No. 3,065,853. The variable speeds permit a change in volume which is the sixth factor in the control of the supply of air to properly suspend the mineral bed for classification. The alternate zones or even cells that alternately pulsate aids in this classification. The pulsations in chamber 12 are produced by the valve member 44 which is merely a center balanced butterfly valve. This chamber 12 supplies the pulsating air for the last two cells 5 in the chamber 9 wherein the bed 3 has a greater slope. The rotary pulsating valve 44 is driven by the variable speed motor and reducer 47.

Each of the replaceable or exchangeable consecutive cells 5 and 22 are constructed to selectively have the proper effect on the particular mineral bed being treated to draw off the proper size and specific gravity whether light or heavy as the bed progresses down the screen. The last two cells 45 and 46 require a considerably greater amount of air at high pressure as the stratified layer of high specific gravity is concentrated at the under side of the bed over these cells.

The lower end of the chamber 2 is provided with a discharge chute 50 which is steep in its inclinator and is provided with a lip or dam 51 at its upper end.

At the end of the chamber 2 a discharge chute 50 which is rather steep in its inclination has a lip or dam 51 at its upper end. This dam has upper and lower projections 52 and 53 that fit on the top and bottom of the chute 50 which permit the dam member 51 to be removable and changed for different types of run of the mine mineral. It will be noted that the bottom edge of the dam is spaced from the screen 3 and this spacing permits the flow of the reject material from the under side of the stratified bed; whereas the lighter specific gravity will flow over the top of the dam 51 and pass down the chute 50 cleaned of all of its reject. The chute 50 rests on the cam 54 which is mounted on the shaft 55 rotated by the hand lever 56. Thus, different positions of the lever 56 will cause the cam 54 to vary the height of the chute 50 and thus the opening between the bottom edge of the dam 51 and the screen. A stop 57 is engaged by the movable abutment 58 on the shaft 55 to limit the movement of the lever 56 and the spring 60 is attached to the lever 56 to maintain the movable abutment 58 against the stop 57 and thus at all times maintain a constant opening between the bottom of the dam 51 and the screen 3. If for some reason a large chunk of material descends in the pneumatically suspended bend and tends to clog this opening under the dam, one need only to manually depress the lever 56 and the cam 54 will raise the chute 50 and the dam to permit the large piece that is blocking the dam to pass therethrough to reject. The mere release of the handle 56 causes the spring 60 to move into its fixed position against the stop 57.

The air chamber has exposed thereto a servomotor of pneumatic type containing a flexible diaphragm 61 which is fastened between the annular rings 62 and the center of the diaphragm is provided with the plates 63 which permit to be attached by the link 64 to the lever 65. The lever 65 is fulcrumed at 66 and its other end is provided with the link 67 that connects to the second lever 68 of the system. The link 67 may be adjusted along the levers 65 and 68 to provide for different weights of the reject material. The end of the lever 68 is supported by the spring 70 and its intermediate portion is fulcrumed as indicated at 71. This fulcrum can be changed in its position along the lever 68 by means of the many holes provided. Thus, the lever 68 is adjustable relative to the lever 65 as well as the link 67.

The fulcrum 71 of the lever 68 carries the refuse gate 72 which receives all the refuse that flows under the dam 51. The refuse is held on the gate by reasons of the lever system and is opened only when the air effective on the diaphragm 61 is of sufficient pressure which indicates that it is having a very difficult time pneumatically suspending the bed of coal just above the dam 51. As the reject strata in the bed on the screen 3 becomes very dense, the pressure in the chamber 12 increases. This dense material is of course a measurement of the weight of the reject and since the high density creates an increased pressure on the diaphragm 61 the lever 65 will be rotated clockwise and pull the lever 68 against the tension of the spring 70 and will open the gate 72 and allow more or less reject to flow from the end of the screen 3.

A timer motor 69 is provided with a crank that operates through one complete turn and pulls on the lever 68 against the tension of the spring 70 to open the dam periodically. However, this control is extended. If the denseness of the material causes the diaphragm 61 to operate several times to open the gate 72 within the period for which the timer control motor 69 is set to operate then the control timer motor 69 is operated by the lever 65 as shown. Thus, the number of times the diaphragm operated the gate 72 within the timer period determines the initial operation of the timer. For example, if the timer motor is set to operate every one to three minutes and the diaphragm 61 was called upon to open the gate 72 three times in a period of three minutes then the lever 65 operates the timer motor 69 to energize and operate its crank through one 360° to open the dam 51 and the time cycle of the timer motor would then continue from the end of this operation. The new starting time for timing motor 69 would then be the usual minute period or for whatever time it was set. The reason for this is that the timer motor 69 opens the dam 51 in accordance with the length of the crank arm which is greater than the usual travel of the gate 72. Thus, the open dam would quickly clean out the collection of the heavy specific gravity materials tending to unbalance the operation of the system. These combined functions result in improved classification of the material.

The pulsating air pressure in the chamber 12 is effective to vibrate the lever system in the period of the pulsations of air which vibration makes the lever system sensitive to slight variations in pressure and the gate 72 is thereby maintained open to the proper amount for the exit of the reject at a speed correlated with the density of the reject in the last portion of the screen. With the combined operation of the gate 72 and the dam 51 by the timer motor 69, in this manner a very high degree of accuracy is maintained in the separation of reject by this gaseous suspension classifier. This actually improves the classification ahead of the gate and the dam in taking the intermediate drawoffs.

When a plurality or even where substantially all of the cells along the bed of the machine are drawoff units 22, the dam 51 and all of its control elements therefore may be completely eliminated, thus terminating the machine length with the end of the last two cells 45 and 46 of the machine. This is due, of course, to the multiple number of drawoff units 22 involved in such a machine.

Even with a plurality of drawoff units 22, it may be advisable to modify the gate or dam structure at the end of the machine due to the particular size and specific gravity of the material being classified by employing a constant minimum opening at the end of the screen 3. Under such circumstances, it would not be necessary to use the pneumatic balance through the diaphragm 61 but would be advisable to use the timer motor 69 that periodically opens the dam 51 at predetermined time intervals which may be in time periods calculated in minutes. For example, with such an operation one may obtain from a selected material to be classified as to size having a 13% 160 gravity sink a reduction to 4% 160 gravity sink.

The sides 73 of the chamber 2 may be made of a clear plastic. Such plastic side walls may be made of methyl methacrylate and will last a considerable length of time which is rather difficult to understand as one would think that such a material would become scratched by the particles traveling therethrough. However, the methyl methacrylate is found to stand up far better than that of glass which is much harder and it permits the operator to frequently view the stratification of the reject in the pneumatically suspended pulsating bed.

The lateral throat 74 connecting the chamber for the diaphragm 61 has the valve opening 75 on one side thereof which is closed by the valve 76 attached to the valve bell crank lever 77 having a fulcrum at 78 and carrying a poise 80. The poise is adjustable along the horizontally disposed arm of the bell crank 77 in the manner of that of a beam balance. The pressure that the poise exerts on the valve opposes the internal pneumatic pressure of the fifth chamber 12. Thus, the area of the valve 76 that is exposed together with the weight of the bell crank and poise must be calibrated against the air pressures built up in the chamber 12 for different coal having varying amounts of bone, slate and other waste. This bell crank arm is also readily operable by hand.

It should be noted that the valve 76 is out of the way of the path of flow of air so that the actual movement of air is ineffective on the valve.

As shown in FIGS. 1, 2 and 3, the lateral discharge screw conveyor 28 for each intermediate classification takeoff unit 22 has a drop chute 81 to the common conveyor 82 that leads to the end of the lower end of the bed to a collection depot. This conveyor as well as the screws 28 are driven by the motor 83 through chains 84 and 84' and a common kelly bar shaft 85 which had a slidable drive connection in the worm of each right angle takeoff drive 86 for the lateral screws 28. The output shaft of each takeoff 86 has a coupling 87 which disconnects the same from the conveyor 28 and allows the takeoff 86 to be slid along the kelly bar 85. When the takeoff is swung or flopped or moved away from the conveyor 28, the latter may be withdrawn with the whole cell by detaching the drop chute 81 from the common conveyor and moved to another position or merely replaced by a marble cell 5. This removes the whole takeoff cell 22 including the screens 24 and 25 which are replaced by the screen 3 of the new cell 5 moved in to take its place. The common conveyor has covers or hatches to close the openings of the down chutes 81.

In FIGS. 4 and 5, the kelly bar shaft 85 is supported by bearings above the position of the sloping bed 3 and the right angle takeoff drives 86 are hanging from the kelly bar drive shaft. Each of the drop chutes 81 pass to individual bins or to a common horizontal conveyor not shown. This suspended type drive when turned upwardly permits free access to all of the other cells 5 permitting them to be readily changed to suit the classification changes required.

As shown in FIG. 5, an air duct 88 is positioned along the same slope as the bed and below the cells 5 and the valves 18 and actually at the top of the air chambers 10, 11 and 12. This duct 88 is supplied with an independent source of air pressure indicated by the blower 90 operated by the motor 91 and pulsated by the valve 92, operated from the motor 31 as indicated in FIG. 4.

The duct 88 has a gate 93 and a long slide valve 94 for each cell position to isolate that cell from the respective chambers. There are times when both the pulsating air from the duct 88 as well as the pulsating air from the chamber 10 or 11 or 12 should be employed at the same time on the same cell or classifying takeoff 22 in which case the valve or gate 93 is opened and the slide valve or gate 94 is not put in place. With this combination, most any desirable pneumatic pulsating pressure may be produced along anyone of the cells 5 or the classifying takeoffs 22.

As shown in FIG. 6, the marble packs in cells each have a rack whether it is in the cells 5 or 22. The racks are shown at 95 and protrude through seals 96 to a pivot point on the lever 97 and the opposite end of which is forked to receive the cam 98 on the rotating shaft 99 covered on suitable bearings. Thus, by the rotation of the shaft 99 the cams operate the pivotally supported lever 97 to reciprocate the racks and shake the dust from the marble pack.

In FIG. 7 another type of individually operated manual shaker for the racks is provided. This pneumatic or electrically actuated hand type gun 100 is connected to a source of energy indicated by the line 101 and is constructed to reciprocate the socket 102. This socket has a downwardly open groove 103 to fit over the cylindrical head 104 on the end of the marble rack 95. The operator places the socket down onto the head and when he pulls the trigger the gun reciprocates the rack at a rapid pace.

Thus, each intermediate takeoff 22 shown in FIG. 8, has a screen with openings selected to draw off certain sized materials. Assuming that the material is separated in groups ranging as follows: (1) ¾″ to ½″, (2) ½″ to ⅜″, (3) ⅜″ to ¼″, (4) ¼″ to ⅛″, and (5) ⅛″ to 28 mesh. Of these five groups, a run of material may be 15% to 25% for each of the five groups which would total 80% for the run and the final 20% of the run would then be less than 28 mesh as the sixth group. These ranges may, of course, be different for different minerals as well as for different materials that are not minerals. This run may be a raw batch of material. The separation may, of course, include a greater number of groups for the run. The screens permitting these intermediate takeoffs are made to admit the sizes of materials for the selected group. The openings must be as long and as wide as the particle and it must be for selected thicknesses. Thus, it may be necessary to rerun the group to obtain different thicknesses as well as length and width assuming that the thickness may be as much or greater than the width of the particle.

To make the last cell 22 the drawoff cell for the particles of the desired group, the preceding cells 5 must be regulated to handle and suspend the bed of material above the screen at the takeoff position to allow that size range group with its specific gravity to ride along the bottom of the downwardly flowing bed. It may take two cells 5 or three cells 5 to accomplish this feat. Again, the regulation of the bed suspension of these cells has to be such that this selected size will go or stay on the screen to be selected for this drawoff cell width at this particular position on the bed. The screen deck may be vibrated to aid in this drawoff at the cell units 22.

Also, as noted before, due to size and specific gravity of the material being classified it may be necessary to employ a majority of drawoff cell units 22. Such a case would be where the material is easily and therefore almost pneumatically fluidized on being received upon the upper end of the screen 3 in view of its lower specific gravity characteristic. Further such material may be of a variety of sizes which are readily drawn off consecutively according to size.

It should be noted that a particular size of material withdrawn from the pneumatically fluidized bed of material is also governed by the mesh or screen opening of the screens 3 and 24.

The pneumatic suspension of the bed may be considered as a fluidized bed. The greater the specific gravity of the material the greater the degree of slope to the horizontal is required and the greater the fluid or pneumatic pressure is required. A minimum slope may be from six to eight degrees and a maximum slope may be from twelve to fifteen degrees. It was discovered that a predetermined pressure and a predetermined slope may be selected to obtain classification of a specific size range of particles of a specific gravity. The rear of the machine frame is supported on jacks 105 which when raised or lowered change the degree of slope of this bed. The air valves and the speed of the fans determine the air pressure supplied to the marbles which likewise affect the flow and pressure. Thus, a separator machine is programmed by these variables to produce a predetermined classification as to particle size and specific gravity along the length of the bed. Such classification is successful for minerals such as gold for such materials such as potash. The classification is selected and drawn off which is impossible with the operation of this machine as a mere coal stratifier with one intermediate takeoff of slate and a final separation of the stratified layer at the lower end of the bed.

I claim:

1. The method of selectively classifying and removing preselected materials of predetermined character as to size and specific gravity from a uniformly crushed bed of the material which consists of the steps of pneumatically suspending a downwardly sloping bed of the material by supplying pulsating air under pressure upwardly therethrough for the full length of the bed to move the material downwardly and to stratify the same according to specific gravity as it moves therealong, separating the stratified materials adjacent the lower end of the bed, selectively separating the materials or predetermined sizes and of a predetermined specific gravity at positions along the suspended bed and before the lower end thereof, independently drawing off the selectively separated materials at the different positions along the bed and relocating the positions of selection to obtain a predetermined classification.

2. The method of selectively classifying and removing preselected materials of predetermined character as to size and specific gravity from a bed of material which consists of the steps of pneumatically suspending a downwardly sloping bed of the material by supplying pulsating air under pressure upwardly therethrough for the full length of the bed to move the material downwardly and to stratify the same according to specific gravity as it moves therealong, controlling the rate of flow of the bed of material as it moves downwardly on the sloping bed, selectively separating the materials of predetermined sizes and of predetermined specific gravity at positions along the suspended bed and before the lower end thereof, independently withdrawing the selectively separated materials at the different positions along the bed and relocating the positions of selection to obtain a predetermined classification.

3. The method of claim 2 characterized in that the step of controlling the rate of flow of the bed of material as it moves downwardly on the sloping bed includes the steps of adjustably controlling the supply of pulsating air selectively along the full length of the bed as well as adjustably controlling the rate of flow of material off the lower end of the bed in cooperative relation therewith.

4. The method of selectively classifying and removing preselected materials of specific size and specific gravity from a bed of the material moving downwardly on a sloping bed having a series of interchangeably mounted cells, which consists of the steps of separating the materials into a plurality of groups each of which has a different range in size, preselecting cells for at least one range size group, pneumatically suspending all groups as the material flows downwardly on the sloping bed suspended by pulsating air flowing under selected pressures upwardly through the preselected of said cells and for the full length of the bed, dividing the preselected interchangeably mounted cells into predetermined lateral drawoff sections arranging the preselected interchangeably mounted lateral drawoff cell unit in each drawoff section to drawoff materials of specific size and specific gravity, regulating the supply and pressure of pulsating air upwardly through the preselected interchangeably mounted cells of each lateral drawoff section to properly pneumatically fluidize and preposition the selected size of materials at each interchangeably mounted lateral drawoff cell unit of each drawoff section, and independently drawing off the material of specific size and specific gravity at each lateral drawoff cell unit to complete the classification of the material.

5. The method of selectively classifying and removing preselected materials of specific size and specific gravity from a bed of the material moving downwardly on a sloping bed having a series of interchangeably mounted cells, which consists of the steps of separating the materials into a plurality of groups each of which has a different range in size, preselecting cells for at least one range size group, pneumatically suspending all groups as the material flows downwardly on the sloping bed suspended by pulsating air flowing under selected pressures upwardly through the preselected of said cells and for the full length of the bed, dividing the preselected interchangeably mounted cells into predetermined sections, arranging a preselected interchangeably mounted lateral drawoff cell unit in each section to drawoff materials of specific size and specific gravity, regulating the supply and pressure of pulsating air upwardly through the preselected interchangeably mounted cells of each section to properly pneumatically fluidize and preposition the selected size of materials at each lateral drawoff cell unit of each section, adjustably controlling the rate of flow of the bed of material off the end of the sloping bed in cooperative relation with the regulation of supply and pressure of pulsating air upwardly through preselected interchangeably mounted cells and independently laterally withdrawing the material of specific size and gravity from the sloping bed at each lateral drawoff cell unit.

6. The method of selectively classifying and removing preselected materials of specific size and specific gravity from a bed of the material moving downwardly on a sloping bed having a series of interchangeably mounted cells, which consists of the steps of separating the materials into a plurality of groups each of which has a different range in size, preselecting cells for at least one range size group, prearranging the preselected interchangeably mounted marble pack cells and lateral drawoff cell units along and underneath the sloping bed to properly pneumatically suspend the range size group and consecutively laterally drawoff materials in the range size group of different specific size and gravity, pneumatically suspending all groups as the material flows downwardly on the sloping bed suspended by pulsating air flowing under selected pressure along the sloping bed and upwardly through the interchangeably mounted marble pack cells and lateral drawoff cell units for the full length thereof, regulating the supply and pressure of pulsating air upwardly through the preselected interchangeably mounted cells of each group to properly pneumatically fluidize and preposition the selected size of materials at each lateral drawoff cell unit of each section, adjustably controlling the rate of flow of the bed of material off the end of the sloping bed in cooperative relation with the regulation of supply and pressure of pulsating air upwardly through the preselected interchangeably mounted cells and independently laterally withdrawing the material of specific size and gravity from the sloping bed at each lateral drawoff cell unit.

7. The method of claim 6 which also includes the step of selecting and relocating the positions of the proper screen size opening of the screen sections in the sloping bed over each interchangeably mounted lateral drawoff cell unit to permit the passage of the material of proper specific size and gravity in the range size group after the step of prearranging the marble pack cells and lateral drawoff cell units along and underneath the sloping bed.

8. A machine for classifying material as to size and specific gravity which consists of a chamber having a downwardly sloping screen with a series of independent air diffusing marble pack cells thereunder and means supplying pulsating air under pressure to the under side of said cells and an independent air control valve for each cell to suspend a bed of material above the screen and cause it to stratify as it moves downwardly and a dam at the lower end of the bed which separates the stratified layers of different specific gravity, characterized in that each marble pack cell has secured thereto its own section of said screen and each cell and screen section is interchangeably mounted as a cell unit from said machine, selected of said cell units including a takeoff cell unit each having its own marble pack and screen section and also including a delivery screen and lateral takeoff means mounted to receive selected materials from said delivery screen, said marble pack cells and said takeoff cell units arranged under said downwardly sloping screen to permit each of said drawoff cell units to withdraw consecutively different sizes of material after the material has been properly stratified into layers of different specific gravity.

9. The machine of claim 8 characterized by displacing racks in the marble packs of each of said cell units, means to reciprocate said racks to agitate the marble packs.

10. The machine of claim 8 characterized by means to selectively vibrate any of said takeoff cell unit screen sections to aid in drawing off at said drawoff cell units selected of said materials being classified.

11. A machine for classifying material as to size and specific gravity which consists of a chamber having a downwardly sloping screen with a series of independent air diffusing marble pack cells thereunder, each cell supplied by pulsating air under pressure controlled by an independent control valve for each cell to suspend a bed of material above the screen and cause it to flow downwardly to the lower end of the bed and a dam at the lower end of said bed which separates the stratified layers of different specific gravity, characterized in that each marble pack cell has secured thereto its own section of said screen and each cell and screen section is interchangeably mounted as a cell unit from said machine, selected of said cell units including a drawoff unit each having one of said marble pack cells cooperating with a section of said screen and also having a delivery screen and a lateral drawoff means mounted to receive selected materials from said delivery screen, said downwardly sloping screen including the screen sections of at least two of said drawoff units, a plurality of marble pack cells preceding each of said drawoff units to form a cooperative group of cells suspending said bed to selectively arrange and drawoff materials of predetermined size and specific gravity at each drawoff unit.

12. The machine of claim 11 characterized by displacing racks in the marble packs of each of said cell units, means to reciprocate said racks to agitate the marble packs.

13. The machine of claim 11 characterized by means to selectively vibrate any of said takeoff cell unit screen sections to aid in drawing off at said drawoff cell units selected of said materials being classified.

14. A machine for classifying material as to size and specific gravity which consists of a chamber having a downwardly sloping screen with a series of independent air diffusing marble pack cells thereunder and means supplying pulsating air under pressure to the under side of said cells and an indepent air control valve for each cell to suspend a bed of material above the screen and cause it to stratify in layers of different specific gravity as it moves downwardly on said sloping screen, characterized in that each marble pack cell has secured thereto its own section of said screen and each cell and screen section is interchangeably mounted as a cell unit from said machine, selected of said cell units including a takeoff cell unit each having its own marble pack and screen section and also including a delivery screen and a lateral takeoff means mounted to receive selected materials from said delivery screen, a dam at the lower end of said downwardly sloping screen maintained at a constant minimum opening to forcibly restrain the downwardly flow of material on said sloping screen, control means to periodically open said dam at predetermined time intervals to permit an increased unobstructed downward flow of material on said sloping screen, said marble pack cells and said takeoff cell units arranged under said downwardly sloping screen to cooperate with said control means to properly stratify the material into layers of different specific gravity and withdraw consecutively different sizes of material.

15. The machine of claim 14 characterized by displacing racks in the marble packs of each of said cell units, means to reciprocate said racks to agitate the marble packs.

16. The machine of claim 14 characterized by means to selectively vibrate any of said takeoff cell unit screen sections to aid in drawing off at said drawoff cell units selected of said materials being classified.

References Cited

UNITED STATES PATENTS

| | | | |
|---|---|---|---|
| 2,303,367 | 12/1942 | Kendall et al. | 209—44 |
| 2,374,865 | 5/1945 | Haworth | 209—475 |
| 2,513,960 | 7/1950 | Ore | 209—468 |
| 2,598,934 | 6/1952 | Ore et al. | 209—468 X |
| 2,764,293 | 9/1956 | Forsberg | 209—467 |
| 2,851,160 | 9/1958 | Ore | 209—468 X |
| 3,065,853 | 11/1962 | Binnix | 209—468 X |
| 3,066,800 | 12/1962 | Binnix | 209—44 |
| 3,246,756 | 4/1966 | Binnix | 209—475 |
| 3,278,029 | 10/1966 | Binnix | 209—44 X |

HARRY B. THORNTON, *Primary Examiner.*

T. R. MILES, *Assistant Examiner.*

U.S. Cl. X.R.

209—468, 475, 496